(12) United States Patent
Beck

(10) Patent No.: US 6,202,417 B1
(45) Date of Patent: Mar. 20, 2001

(54) OCEAN THERMAL GRADIENT HYDRAULIC POWER PLANT

(76) Inventor: Earl J. Beck, 125 Feliz Dr., Oak View, CA (US) 93022

(\*) Notice: Subject to any disclaimer, the term of this patent is extended or adjusted under 35 U.S.C. 154(b) by 0 days.

(21) Appl. No.: 09/327,436

(22) Filed: Jun. 8, 1999

(51) Int. Cl.$^7$ .................................................. F03G 7/04
(52) U.S. Cl. ................................... 60/641.7; 95/248
(58) Field of Search ................................. 60/398, 641.7, 60/641.6; 95/248

(56) References Cited

U.S. PATENT DOCUMENTS

| | | | |
|---|---|---|---|
| 2,006,985 | 7/1935 | Claude et al. | 60/641.7 X |
| 3,805,515 | 4/1974 | Zener . | |
| 3,967,449 | 7/1976 | Beck | 60/641.7 |
| 4,186,311 | \* 1/1980 | Humiston | 60/641.7 X |
| 4,200,807 | \* 4/1980 | Humiston | 60/641.7 X |
| 4,302,297 | \* 11/1981 | Humiston | 60/641.7 X |
| 4,441,321 | \* 4/1984 | Ridgway | 60/641.7 |
| 5,749,945 | 5/1998 | Beck | 95/248 |

\* cited by examiner

*Primary Examiner*—John E. Ryznic

(57) ABSTRACT

The present patent incorporates major improvements and simplifications of 1976 U.S. Pat. No. 3,967,449 necessary to make the concept functional and useful on a large scale. The earlier patent listed many approaches to the several design problems believed to be necessary at the time of the earlier application, while this one reflects the extensive research and laboratory investigation to identify, validate and demonstrate the functionality of the various parts. In particular, the methods for producing the necessary nuclei for steam bubble production, the method of insuring bubble growth, the method of condensing the steam bubbles produced and methods for minimizing the release of air in large bubbles, and for dealing with those that are released are covered in detail. The first patent, with 50 claims listed many approaches to many problems, some of which were either misunderstood from an unsatisfactory literature or unnecessarily complicated. To an extent those have been eliminated, resulting in what appears to be the simplest embodiment of the concept.

8 Claims, 5 Drawing Sheets

OCEAN THERMAL GRADIENT HYDRAULIC POWER PLANT

BACKGROUND OF THE INVENTION

1. Field of the Invention

Figure 1:
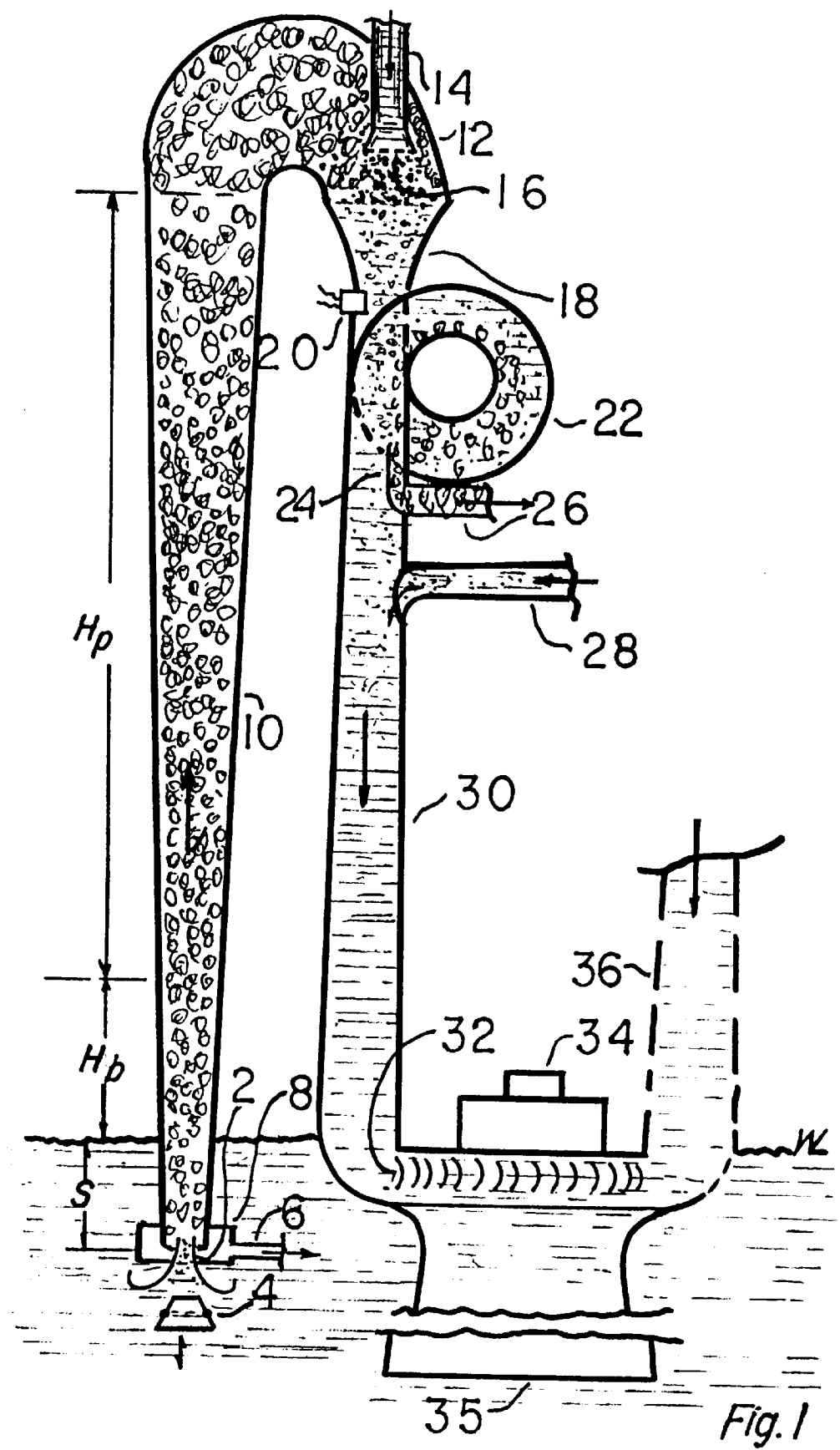

The present invention relates to improved methods for the design of the various parts of a concept for building power-producing plants using the temperature difference between the warm surface waters of the tropical oceans, typically of the order of 27° C. and the deep bottom waters which may approach the freezing point of salt water but generally are of a higher but useful temperature for condensing the steam bubbles produced. The general method of construction is to introduce the warm surface waters from a preferred depth below the surface, producing steam bubble nuclei, then forming steam bubbles of a desired size. These reduce the density of a rising column of seawater as in the old art of the air lift pump. The ALP, while functional, was poorly understood when this effort was undertaken. In the OTGHPP, The low—pressure steam filling the bubbles is condensed with the cold water pumped from lower ocean depths, the air released is eliminated and the resulting high density column of sea water is allowed to fall and exit through a suitably designed hydraulic turbine, producing shaftpower for driving a generator to produce electricity, or to drive other machines for on-site industrial uses. In its hydraulic aspects, the OTGHPP resembles the ALP, but thermodynamically the two concepts are dissimilar. The ALP requires power to produced compressed air to form the bubbles injected at its bottom, while the OTGHPP uses the heat of the warm ocean surface waters to produce voids in the form of steam bubbles.

2. Description of the Prior Art

The earliest known suggestion for producing power from the temperature difference in the tropical oceans between warm surface waters and deep cold water, producing the necessary temperature difference was by Lord Rayleigh in the late 19th century. He suggested evaporating a suitable working fluid to produce a high-pressure vapor which them would produce power in an engine or turbine of suitable design, and condensing the working fluid with the cold water in surface condensers. The best known and probably the first significant effort to produce a large, useful machine was by Georges Claude, a French inventor and successful developer of a method for liquifying air, which made his ocean efforts financially possible. Claude was probably one of the best informed of the industrialists at the time in using evaporating and condensing liquids in closed systems. He knew the difficulties and costs of transferring heat as suggested by Rayleigh, so avoided that path, opting for an open cycle leading to his 1935 patent. His method was simple but the equipment extremely large and costly. But he persevered, even to the point of commissioning his friend Rateau, the inventor of the impulse steam turbine, to design and build for him a low-pressure turbine specifically for use in his system. His problems were not entirely with the cycle chosen. He was overwhelmed with the sea-going problems because the state of the art in what has become to be known as "Ocean Engineering" was virtually nil. His equipment came to disasters at the hand of the oceans. The basic technical fault as I have analyzed his work lay in the fact that he produced very low pressure, high volume steam by throttling. The greater the throttling or constant energy pressure drop, the less the available pressure drop for the steam to use in the turbines. Low pressure (at about, for instance, a pressure of say, 0.05 bar) has such a low density and high specific volume(about $0.037$ kg m$^{-1}$ and 26 m$^3$kg$^{-1}$ respectively) that it is virtually useless in practical turbines. Then, of course, to produce such low pressure steam by throttling uses most of the initial thermodynamic potential, which is marginal at best because of the relatively small temperature difference between warm surface waters and deep cold waters of the tropical oceans. Claude is known to have produced only a few papers, none specific in the thermodynamics and may never have realized the enormity of these thermodynamically limiting problems. But he did not give up easily.

There have been efforts to produce a system using the closed cycle, as suggested by Rayleigh, i.e. the reverse of a refrigeration cycle, wherein a working fluid such as ammonia is evaporated outside tubing heated by warm seawater flowing in the tubes, and condensing the vapor in a conventional surface condenser. The most ambitious and complete of these was a multi-year effort in the first half of the 1970's undertaken by the National Science Foundation and finally terminated in the same program after it was transferred to the Department of Energy. While this multi-pronged effort (it included work on many problems, from sea-keeping of floating systems, anchoring at sea, to transmission of power in bottom-laid cables to name a few) it did not produce a cost-effective design, All of this work is, of course, available to future system developers. A summary of this work would be very extensive, but here is how I view it in retrospect, as one of the many participants. The best possible system devised used massive tubes in great numbers, preferably made of titanium to provide long-life. But titanium, unlike copper-bearing alloys usually used in marine condensers, provides no protection against marine fouling. As an aside, the marine bronzes of use in condensing achieve a measure of anti-fouling only by wasting of toxic copper ions, so their life is short. Also, copper is not compatible chemically with ammonia, the probable working fluid (refrigerant) of choice. To top this picture off, realize that if a very large system using titanium tubes (which does not corrode in sea water) could be justified on the basis of the cost of power produced, only 1 plant capable of powering, say a city of 50,000 people could be built each year, if all the titanium produced were dedicated to that one plant. If we tried to produce all the power used in the United States with such plants, we'd need 5,000 years to build them, based on present production of titanium. Not an optimistic finding at best.

With that background, I describe briefly the thinking that led to my 1976 patent, and how it was deficient in detail and finally, how I have revised the OTGHPP's design to make up for those deficiencies. They were based largely on impressions from an extensive cavitation literature, and engineering handbook accounts of devices on which my concept was patterned in part, the air lift pump (ALP) and the Taylor hydraulic air compressor (THAC). First, a description of the ALP, one not found so far as I have been able to find in the scientific or engineering literature, even those that proposed to tell you how make one If you thrust an open vertical pipe part-way down in water, with its lower end at a depth below the surface, S (for submergence), that end is at a pressure equivalent to the static head of water at that depth. If you then (at considerable cost in power) introduce air bubbles at the lower end, and if they do not all coalesce (as they want to do, unfortunately) then you produce a low-density "foam". This foam is supported by the pressure equivalent to the submergence S, and rises in the pipe. At the top the air bubbles break and the water has been pumped to a height depending on the ratio of densities in the water and the foam columns density. The pumping effect produced is, of course, subject to the hydraulic laws as found in Bernoulli's equation. If the velocity is high, much of the available pressure, the product of S and density, ρ, is used in accelerating the foam mixture.

The THAC is, in effect, an upsidedown ALP. Visualize the pipe of the ALP raised until its lower end is just submerged, and water is then poured in at the upper end at a rate sufficient to keep it full. Then if you insert the open end of a tube into the upper end of the large tube carrying water downward (which preferably may be reduced cross sectional area in the nature of a venturi to lower the pressure and so induce air), air will be forced from the small tube into the down-flowing stream. A bubble will be carried down with the falling water and will feel increased pressure. The bubbles's contents will be compressed as the pressure in the water column rises with depth. At least one successful THAC was been built and used for producing compressed air for mining. Before being used, the volume of the air was increased by heating in a stove through which the pipe carrying it passed. Good thinking.

But this device, which promised to be of such value at the time of conception of the OTGHPP, proved to be unworkable as originally concieved. It was expected that the steam bubbles in the pump column of the steam lift pump (SLP) would be broken at its top, the steam condensed and the air released removed pretty much as envisioned in the engineering literature of the THAC. Unfortunately, my experiments in the late 1970's showed that both the THAC and barometric condenser which were part of the original concept would probably be impractical in this application. Further experiments on model ALP's and THAC's convinced me that the system would be impractical if (a) the steam bubbles were allowed to escape and (b) in breaking the steam (and of course, air) bubbles, the air released would require an impossibly large and efficient THAC. Also required would be a very large and tall barometric condenser. Such a condenser would let a lot of the water fall without making power.

The present invention describes the design changes in the OTGHPP necessary to nucleate, grow, and condense steam bubble and remove the air unavoidably released from large bubbles, although hopefully to be minimized in one of the several design features shown. Finally, much of the work done early in developing the instant improvements was to make a practical, large-scale OTGHPP capable of producing the prodigious amounts of power needed by modem industrial societies. Certainly the size of the tropical oceans is sufficient to produce the desired power if useful (cost, size, etc) power plants can be built and maintained at sea.

Patents are meant to be monopolies favoring the inventor during their life-times so not all trade secrets must be revealed. Nevertheless, I anticipate releasing much of my research work to assist rapid commercial development. The work is documented in a large number of monographs in my patent notebooks on Ocean Thermal Gradient Hydraulic Power Plant (File OTEC.__) and Apparatus for Rapidly Degassing and Decontaminating Liquids (File DEGAS.---). Results reported in the later series resulted in a patent dated May 12, 1998, U.S. Pat. No. 5,749,945 to Beck, and referred to as Beck '98 from hereon, (hereby incorporated by reference). For simplicity in reading, I will avoid referring individually to these many monographs in preparing this patent application. But their existence may be implied with confidence by my readers. This application bears the file number OTEC.103 in the first of the two series.

SUMMARY OF THE INVENTION

The present invention summarizes the design and conceptual changes made to the OTGHPP since my 1976 patent, which while visionary and in many respects correct, was largely based on inadequate accounts and inadequate published research results. It also conatained many alternative constructs, eliminated here. My revised OTGHPP resulting from many years of work as described below. This includes for discussion the various parts as and shown in the drawings. Let me be specific about the first component in the device, at the point of entry of the warm near-surface seawater into the SLP at its lower end. The depth of submergence, S, is taken as the depth of the throat, or smallest (and so highest velocity) point in its diameter. This intake nozzle serves three purposes. First, it controls the amount (rate) of water taken in for subsequent pumping to a higher elevation, according to well established hydraulic principles. The converging stream is reduced to a minimum diameter and so maximum velocity and minimum pressure, according to Bernoulli's equation. A second function is to release air at preferred rates and micro-bubble sizes for nucleation of steam bubbles. The third function, new here, is to "tie up" the excess air removed from solution into micro-bubbles so that they will not diffuse into the steam bubbles and so later have to be removed in the vacuum system. The very small air bubbles, which may be as small as 1 micrometer are difficult to break and so pass into the downcomer where they rapidly re-dissolve as the pressure (and so the solubility of air gasses in the water) rise, according to Hentry's Law.

Immediately above the intake nozzle, converging as described above, the pressure is held below the saturation pressure. The actual pressure and temperature at the point of abrupt expansion in area at the lower end of the steam lift pump, allows the area necessary to accomodate the low density foam produced as bubbles form. The size of the bubbles (and concomantly their number per volume of foam) is uniquely determined by the pressure and temperature of the water. In my example used for illustration, and assuming 27° C. warm seawater, that pressure would be below 0.03564 bar, the saturation pressure, about 0.035 bar. At that elevation, depending upon the pressure at the point of steam bubble growth, the column will be filled with steam bubbles, each containing a trivial number of air molecules from the small micro-bubble nucleus on which steam bubble growth depends. That is the nature of steam bubble growth. Individual superheated water molecules see the small collection of air molecules as a free surface and join them. With perfect packing ("cannon ball stacking"), which cannot be expected in a system of this type in which things are happening so rapidly, the bubbles would occupy about 78% of the volume, so the density of the "foam" produced would be about 22% that of the water. But in the real case of imperfect packing—and septa between the bubbles of a finite thickness, unlike the perfectly packed spherical cannon balls—the density would be greater. Since in the end we want to pump water, a higher density all things considered, will be advantageous. For my calculations, I assume a foamdensity of 0.25 t m$^{-3}$ of sea water, which still may be too low for the conditions in practice. Note that bubble size (and so number) may effect the density. With very small bubbles, there will be more water invested in the septa, so a greater foam density. For my calculations I assume a bubble diameter of 10 mm, but experience in large systems may show this not be the best choice. It is an idiosyncrasy of steam bubbles that the nearer the actual pressure is to the saturation pressure, the larger the bubbles beause of the lesser superheat. As the pressure rises to nearly the saturation pressure (and the liquid in which the bubbles float the saturation temperature), the bubble tries to grow to an infinite diameter when water is at its saturation pressure and superheat goes to zero This is the condition we all have observed many times with vigorous boiling "a full rolling boil" in an open sauce pan. To summarize the above as a practical matter, we can postulate that a SLP with foam density of 0.25 of that of water and a submergence plus barometric height (the latter approaches 10 m) of 20 m, the theoretical pumping height would be 20/0.25=80 m reduced, of course by the sum of the velocity and friction heads. In practice the actual pumping head is reduced by the barometric height, $H_b$. The overall design of a useful, large pump has an additional interesting feature. If we increase S by, say 5 m, the pressure at the nozzle intake is increased, and (using our density of 0.25) an increase of 4×5=20 m. But since the SLP is 5 m longer, the actual increase would be 15 m, i.e., 20 as calculated less the increased submergence S. Nevertheless, this appears to be a useful approach and with lttle additional equipment costs. Concievably, submergence could be very high in the deep ocean, to achieve either a higher puming head, $H_p$ or higher velocity, both of which appproaches produce increased useful power and sea water flow in a pump of a given size (diameter).

Immediately above the exit of the convergent intake nozzle (for simplicity referred to here as the nozzle) where the steam bubbles are formed, the design of the SIP at progressively higher levels (increased Z to maintain the selected pressure so as to maintain bubble size and foam density. As the pressure drops, there must be a reduction in velocity of the foam stream to secure a pressure regain equivalent to the reduced static head and, of course friction. So the general shape of the SLP is, according to Bernoulli's principle as applied here, a gradually increasing cross section and so an increasing diameter. Because velocity appears as a square in the equation, the actual shape of the tube would be parabolic, although that is not clearly visible in the figure. If we attempted to make the SLP the maximum height, 80 m, the area at its top would be infinite as would its diameter.

The SLP has a maximum pumping height, e.g. almost 67 m as posited above. That theoretical pumping height is reduced by the sum of the barometric height, $H_b$ and the submergence, S. But it can't be that tall because of the velocity head required to move the foam and also to maintain the pressure required to maintain the steam bubble. This point can't be overly-emphasized both as a design parameter and to insure complete understanding. If at any point the pressure should rise above local saturation pressure, again a function of water temperature, the bubble would instantly and violently disappear—collapse by condensing. The steam bubble both exists and maintains its size only as a result of the water's superheat above its saturation temperature. This is not intuitively known and for many will never be believed. There is an almost universal desire to ascribe the growth of a rising steam bubble in hot water to Boyle's law. In fact, neither Boyle's nor Charles' law has anything to do with steam bubbles' growth, existence or collapse. A steam bubble (or vapor in fluids other than water) depends solely on liquid superheat, and grows by evaporation or shrinks by condensation only as it sees fit to maintain a size as determined by that superheat. The overpressure within the bubble is the pressure equivalent of the water's superheat.

The next portion of the OTGHPP after the SLP is the reversing arc or elbow, which may for practical reasons also be a diffuser, i.e., designed to have an increasing or decreasing cross-sectional area and so reduce or increase the velocity and in turn raise or lower the pressure. At the latter part of this reversing arc, cold water is introduced as a spray, instantly dropping the temperature of the warm and cold water mixture below the saturation temperature, causing cataclysmic condensation of the steam bubbles and in the process, fracturing to some extent the air bubble remaining from each lost steam bubble. This is a highly desirable feature of this present invention, as the smaller the air bubbles descending in the downcomer or SLP, the more quickly they will dissolve because of their high surface area as the pressure rises and the solubility of air in water increases. Unavoidably, without doubt, some air bubbles will remain in fairly good size, and these are separated with some water in system consisting of a centrifugal separator and bubble breakers as described in my 1998 patent in its discussion of its first figure. As a further help in reducing the size of the larger bubbles is the use of an ultrasonic acoustic oscillator, shown schematically in the figures. In the best case the number of large bubbles would be few and those could be separated as shown in my 1998 patent and divided into very small air bubbles. Subdivision of bubbles into smaller bubbles requires work to produced the large, new area in the smaller bubbles; surface tension is a measure of the work to produce the new area Nevertheless, the advantage is so great in having very small bubbles (which for a given number of air molecules will have a reduced volume so not decrease the density of the water in the downcomer or) that some dedication of work to this dividing function can be justified Also, the less air contained in large bubbles and the more contained in very small ones, the less water-air mixture that must be removed from the downcomer, degassed and and reintroduced into the downcomer's column. In the perfect embodiment of the principles stated above, we would learn to make mircro-nuclei increasingly small, without coalescing any of them. They would form the nuclei needed to make an optimum bubble density (foam) and use just enough of these micro-nuclei as needed, one per steam bubble, to nucleate the exact number of steam bubbles required. All the other micro-nuclei would be isolated in the water between the bubbles until the pressure begins to rise as the water (the steam in the bubbles having been condensed) flows down in the downcomer. With the increase in pressure, there is an increasing solubility of the air gasses in the water, according to Henry's law. The increase in solubilty coupled with the large area of the smal bubbles causes their rapid re-solution. This is exactly the desired result at this point in the system, as the hydraulic head on the turbines is a maximum due to the increased density of water without bubbles. The convergent entry nozzle has this potential, that is, to isolate the air not used in nucleation in the smallest possible bubbles, which produce a negligible change in density. But when these very small bubbles' contents redisolve in the downcomer, what little density loss they have caused earlier is restored. In the best of all embodiments, all the air initially invested in mircro bubles at the nozzle's exit would be returned as small bubbles on condensation of the steam bubbles, and neither the separator feature of my DEGASSER or the high-frequency oscillator would be needed. Only the building of very large systems will determine the ability to work thus efficiently, so those two features for handling or destroying large Air bubbles are included here for completeness in the concept.

To get a SLP started, it is necessary to close the opening to the sea (the intake nozzle) with a suitable quick-opening valve, either pneumatically or sea-water hydraulically operated with an air over charge to insure quick opening. There is no need for quick-closing. The starting of the SLP is facilatated by removing the water above the entry, so that a high water velocity can immediately be established when the starting valve is opened. This is a simple pumping function, easily achieved with conventional pumps. An alternative to pumping this water out would be to temporarily fill the SLP tube with compressed air, forcing the water out. This would be more complicated mechanically than pumping, as it would require temporarily seating off the downcomer during starting.

In summary, the revised version of the OTGHPP involves an intake nozzle to meter the water while simultaneously removing dissolved air from the incoming warm seawater, (the "working fluid" in this simple heat machine) to form the necessary small air bubbles to allow steam bubble nucleation. At the exit of the inlet nozzle the pressure is maintained at just below the saturation pressure of the seawater. A relatively few of the micro air bubbles formed in the nozzle are grown to steam bubbles. The warm seawater is cooled only very slightly by evaporation of some water to make steam bubbles. This small cooling is due to the very high specific volume of steam at the low pressures needed at warm ocean sea water temperature, about 27°. The velocity is continuously decreased as the foam rises in the SLP, by increasing the SLP's crossectionnal area. The resulting pressure regain due to a decrease in velocity is needed to keep the pressure approximately the same over the entire length of the SLP. Without this pressure regain as the foam rises the pressure would otherwise fall due to the reduced static head. At the top of the SLP, the flow's direction is reversed from upward to downward in a suitable reversing 180° "U" bend, which may also have a change in area to acclerate or decelerate the foam and change the the pressure as desired. At the end of this reversing elbow a spray of cold water from the ocean's depth reduces the temperature of the water mixture—warm and cold—to below the saturation pressure at that point and the steam in the bubbles cataclysmically condenses. The air entrained in the water descends with the water and bubbles of a size that would not dissolve rapidly are subjected to intense hig-frequency pressure oscillations to break them into smaller bubbles. Those that do not subdivide are removed with some water by the centrifugal separator of my DEGASSER., then to a bubble breaker where the bubbles broken and and their contents sent to a vacuum system. The degassed water is returned to the downcomer and to the hydraulic turbines. The very small air bubbles not separated and broken descend in the downcomer, and be redissolved as the solubility of the air gasses increase with pressure.

A further new feature of this application is the design of the orifices in the condensing spray nozzle at the top of the downcomer column, which is similar to the SLP's intake nozzle, that is, designed to isolate the dissolved air in the cold spray in micro-bubbles so that the air they contain will not have to be removed in the vacuum system, but will dissolve in the water headed for the turbine in the downcomer.

In a real, very large system there will almost certainly be a plethora, perhaps as many as 12 to 15 or more SLP's serving a single large hydraulic turbine, as maximum economy dictates. All the air bubble separators and breakers associated with a single hydraulic turbine will release their air to a single very large vacuum system, to achieve maximum economy of scale and energy usage. For those parts of this new version of the OTGHPP involving nucleation nozzles, air bubble separation and breaking and vacuum systems that are common to this system and my patent Becl '98. That patent is relied on without elaboration here.

A note about size limitations. As discussed earlier, the potential demand for electrical (and power for other uses, such as electrolyzing water to produce hydrogen gas, then compressing or liquifying that gas) is so large that the question may logically be asked, "Is there a size limitation for this new type of power plant that will limit it's output?" The answer is: "Not so far as is known or can be determined at this point". The plant uses a much-studied phenomenon called "cavitation" which is of great indusrial importance because of its destructive action and cause of a loss in efficiency in hydraulic machines. All of the literature seems to be consistent on one point. Cavitation does not scale. That is to say, the pressure-temperature-velocity conditions that cause cavitation in small machines has a similar effect in large machines. Conditions that cause cavitation in small pumps and propellers cause similar cavitation (and damage) in large ones. To the extent that this doctrine in the art is correct, there is theoretically no upper limit to, say, the inlet diameter of a SLP. Nevertheless, all machinery has an upper practical size limit. I speculate that in the early development of large SLP'S, a practical limiting throat diameter of the inlet nozle might be of the order of 0.5 meter. Such a pump would move a great deal of water and produce considerable power. Many of these pumps would be used with one hydraulic turbine. Certainly the size of the tropical oceans is such that it is inconceivable that the supply of warm ocean water would limit the concept for hundreds of years, if ever. Other considerataions such as practical distance for power transmission by undersea cables might limit their distance from shore, but other anchored systems producing, for instance, fertilizer or hydrogen for fuel might be located anywhere in the tropical oceans. They might be anchored or floating free "grazing" as one study suggested.

In conventional power productiong using expanding steam, some factors that could improve the (Rankine) cycle efficiency have allowed the great improvement in thermal efficiency have made great strides. These principally involve raising the boiler pressure and final steam temperature, and lowering the exhaust pressure of the turbines. Much of the improvement has related to improved materials as, for example, the use of materials that alalow very high superheat in an otherwise hostile thermal enviornment.

Just so in the future development of an OTHGHPP we may anticipate future improvements in system design on certain factors now understood but not fully appreciated in terms of power plant design. These do not relate to factors that promise to improve cycle efficiency per se. As the OTGHPP does not depend on expansion of the steam in the bubble reducing density in the SLP, they rather relate to two variables that will effect the output of a plant of a given size. First there is the immersion of the SLP's intake S below sea level. As S is increased beyond the minimm to insure continuous intake of warm seawater, say 1 or 2 m, the pressure at the entry of the CCN increases and since the pressure at its outlet is related to the water temperature, that is not a major variable. If we have a water of a certain temperature, say 27° C., then to make steam bubbles of a desired size, we must lower the pressure in the SLP sufficiently below the saturation pressure to maintain that bubble size. When the submergence S is increased and the pressure at the SLP's intake increased, the pressure drop across the CCN wil 1 increase and so the velocity of the water at its outlet. The increase in S increased the length of the SLP, but since the mutlplier (in this treatment asssumed to be 1/0.025) will be 4 and an increased pumping heigt of 4-ΔS. If, for instance we increase S by 1 m, then the theoretical increase in the useful pumping height for producing power, $H_p$ will be 3 m. This approach clearly has its limitations in floating power plants, where the maximum height may be limited by sea keeping considerations such as stability and damage in storms. Nevertheless, some advantage in power production may accrue if very high velocities are developed but not entirely used in the SLP. Increased velocity at the water turbine may be just as useful as increased pressure from a higher head of sea water.

A second and even, at this point less tractable may be discussed inconsideration with the temperature of the condensing or quench water, where the bubbles are collaapsed. The minimum final temper of the mix of warm and cold seawater is dictated by the saturation pressusre at the point of quench. The final mix's temperature must below, however slightly, the saturation temperature at point, which in turn is determined by the pressure. However, it is not necessary and probably will not be expedient to get the coldest possible condensing water. Rather, it may be advantageous from a system standpoint to pwnp, for instance, twice as much water obtained at a lesser depth below sea level, even if considerabely higher temperature. The OTGHPP has a curious characteristics that makes this appealing from a design standpoint. A shorter cold water intake clearly will be advantageous, cost wise. And while the pumping costs will be higher for the extra volume of cold water, the distance they must be pumped (and friction and more important, density head between the warm water outside the tube and the cold water within will be less. So there almost certainly will be an optimum amount of cold water at each site, due the variations in temperature with depth. Further, as all the cold water acts to produce power (which is diminished by the pumping power), there is a favorable tradeoff in selecting the ratio of warm water elevated in the SLP to the amount of cold water used in condensing. Other variables that may affect the ratio of warm to cold water, not quantifiable at this point are the effect of turbine efficiently handling larger or lesser flows and even, perhaps, the amount of air dissolved in the incoming cold water, as it may vary with depth, pressure and water temperature. These important if not completely quantifiable variables are the basis of the second independent and susbequent dependable claims, which descriptively might be referred to as uniquely process claims. The earlier claims related to the first independend claim, while considering components are, of course, to a great extent also process related.

A BRIEF DESCRIPTION OF THE DRAWINGS

FIG. 1 shows a cross section of a sea water elevating pump consisting of a SLP a reversomg elbow, a spray condenser for collapsing the steam bubbles and a downcomer and a hydraulic turbine accepting water from a number of SLP's as discussed earlier. It shows submergence to insure the intake of warm water, how the water progresses through the system and finally is discharged back into the ocean after it drives the hydraulic turbine, producing power.

Figure 2:
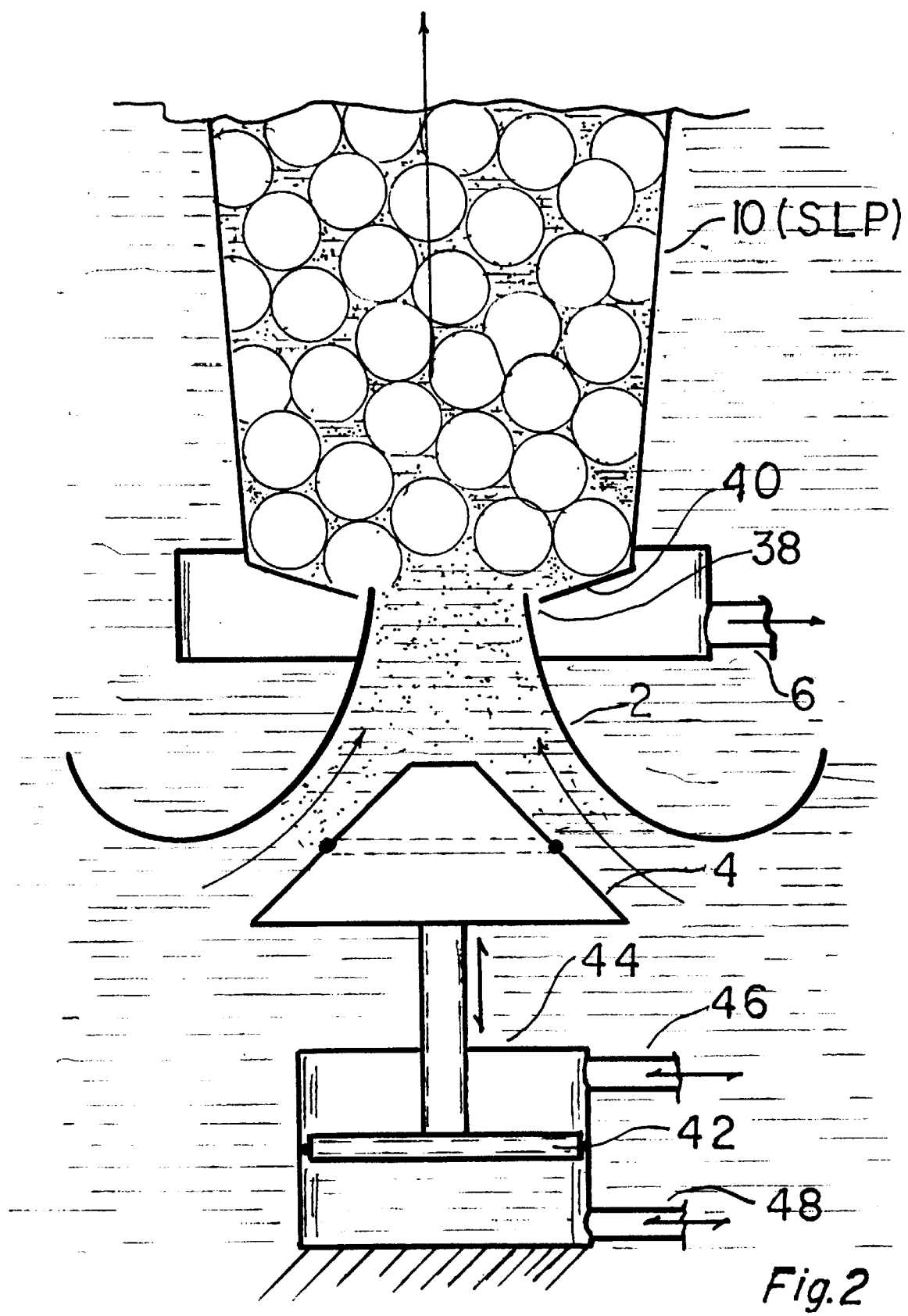

FIG. 2 shows details of the lower end of the SLP, including the enclosure at the end of the intake nozzle allowing dewatering to start the pump and the closure valve also needed to allow dewatering, and rapid opening motive force to initiate cavitation upon start-up The SLP can not be started without its water removed, as the necessary velocity to achieve nucleation in the intake nozzle cannot be accomplished.

Figure 3:
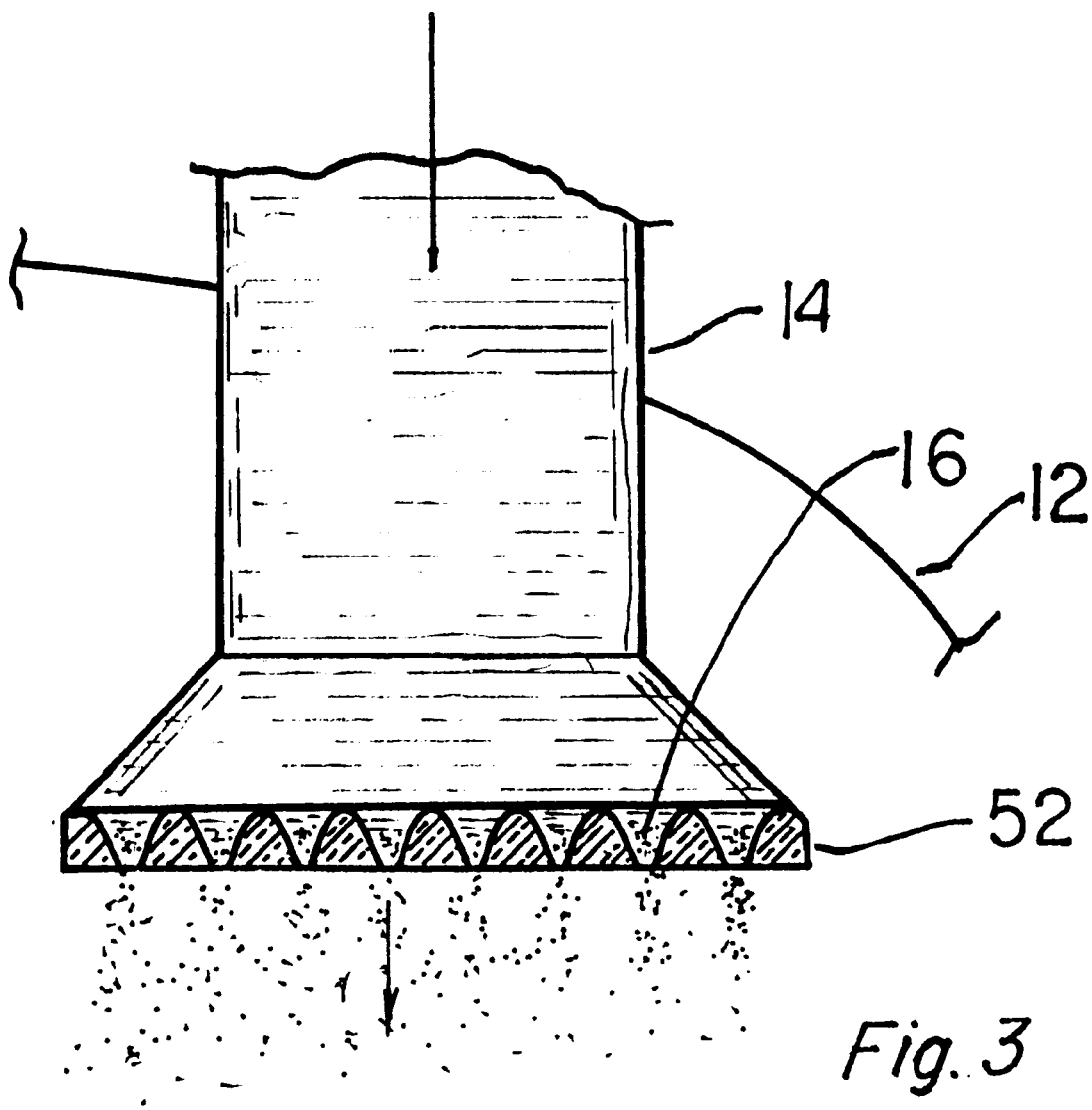

FIG. 3 shows enlarged details of the spray nozzle, including the converging shape of the nozzle's orifices to form micro-bubbles of the formely dissolved air and thus avoiding coalexcence to larger bubbles that would later require separation, breaking andhandling of their contents in a vacuum system.

Figure 4:
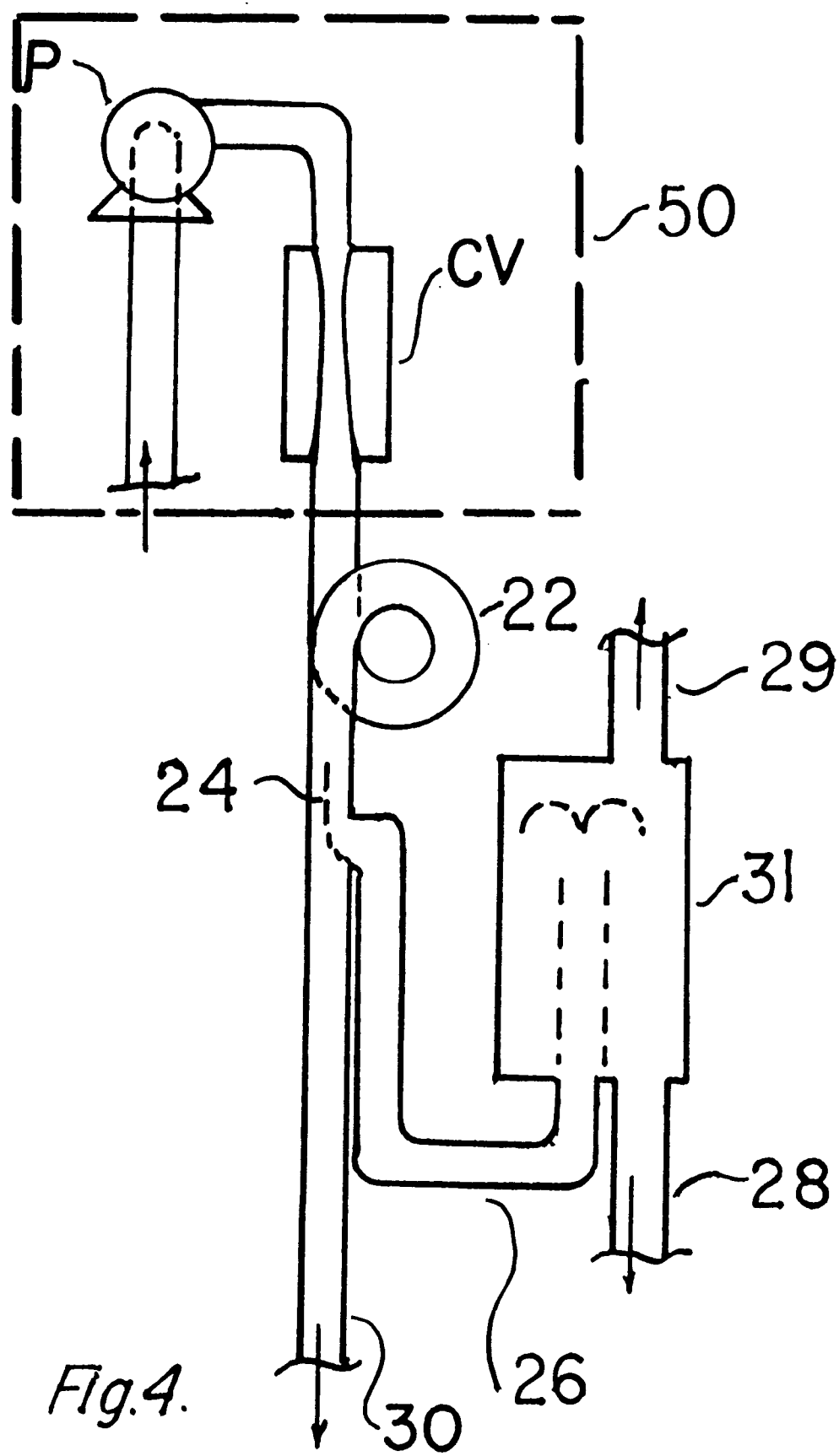

FIG. 4 is adapted from patent Beck '98, FIG. 6A, with those portions not use in this application enclosd in heavy, dashed lines, to emphasize the difference in needs in the two applications. The very thing-coalescence of micro-bubbles in the throat of the CV as used in Beck'98—is avoided in this patent application to minimize the size of air bubbles and so avoid having to remove, break and processing the contents through the vacuum system, which uses parasitic power and so reduces the system's output. Identification numbers have been changed as needed to conform with this application's drawings.

Figure 5:
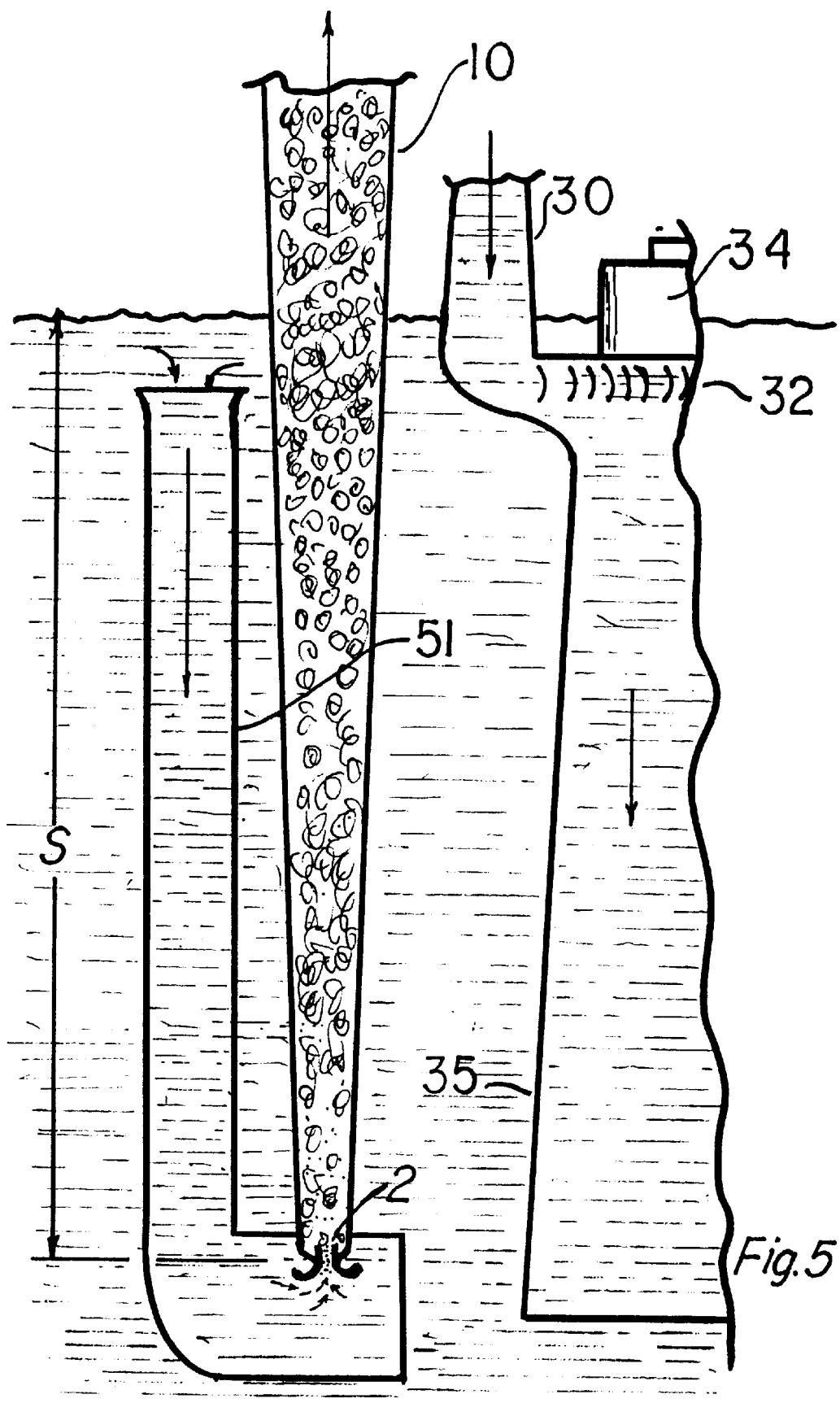

FIG. 5 shows an alternative duct and method for drawing seawater from near the surface into an intake nozzle at considerable submergence, S, and avoid recirculation of the discharge of that cool water back into the intake of the SLP, which water should be the warmest available. This detail was omitted from FIG. 1 for simplicity in presentation.

A DETAILED DESCRIPTION OF THE INVENTION

The function of the various parts of the OTGHPP except for certain parts of the air bubble separation and vacuum system, which are covered in detail in my new DEGASSER patent, may be understood by following the incoming warm seawater through the system, starting at the intake nozzle 2, FIG. 1. This nozzle serves two functions. First, it controls the amount of water let into the SLP above and second, it releases dissolved air to small bubbles to be used as nuclei for the production of steam bubbles immediately above. Most of the air released into micro bubbles in 2 are not needed for nucleation of steam bubbles, so are isolated during transit through the system until they are re later re-dissolved the higher pressures in the downcomer 30.

The abrupt expansion in cross-section at the nozzle's discharge, 40, in the housing 8 allows for proper velocity and pressure at the point of rapid production of steam bubbles, thus reducing the density of the air-water (foam) mixture in the SLP 10, which has a shape designed to reduce the velocity with elevation, Z, in the SLP and so maintain the pressure in the pump essentially constant throughout its length.

The flow-reversing elbow 12 serves 2 functions. First it reverses the direction of flow from upward to downward as needed to produce power. Second, it may by a change in section increase or decrease the velocity and so decrease or increase the pressure. The cold water delivered in duct 14 is pumped from the deep ocean (the pump is not shown for simplicity; it is of conventional centrifugal design and not a novel component here), condenses the steam in the bubbles. The spray produced in orifices 16 does two things. First, by mixing with the warm water from which the steam bubbles were formed, it reduces the water mixture's temperature below the saturation temperature at that point, causing a cataclysmic collapse of the steam bubbles by condensation. The spray also, by the shape of the orifices producing the cold water spray isolates most of the dissolved air in the cold condensing water, avoiding its release to a vacuum system. The converging section 18 serves to provide the proper area for the desired velocity of the water, now rid of its steam. At the bottom end of 18, large air bubbles entrained in spite of attempts to avoid them are reduced in size by a high-frequency osicllator 20. Small air bubbles are not separated in the centrifugal separator 22, a feature of my DEGASSER patent, separates the larger air bubbles and some water which are removed by a scoop 24 and delivered by duct 26 to a bubble breaker, one of several versions of which is shown in a later figures in patent Beck '98. Also not indicated is the vacuum system, which removes the air released in a bubble breaker shown in a later figure and also maintains the low pressure in the SLP necessary to produce steam to form steam bubbles. The water returing from the bubble breaker, shown in a later figure, is returned via duct 28 to the downcomer 30 which delivers it to the hydraulic turbine 32 The water, a mixture of the warm and cold, now travels downward in the downcomer 30 The water sent to the bubble breaker shown later, now devoid of its large air bubbles is returned via duct 28 to the downcomer 30 where it joins the main stream of water in going to the hydraulic turbine 32, producing power in the electric generator 34 or driving other equipment as desired. The water exiting the turbine 32 is passed through a diffuser 35 as is common in Francis hydraulic turbines. At 36 is shown a second downcomer serving the same large hydraulic turbine. There may be many SLPs serving a large hydraulic turbine as discussed earlier.

FIG. 2 shows an enlarged, detailed section of the lower end of the SLP, 10, with a housing 8 enclosing the exit end of the nozzle 2, and showing an annular gap 38 between the end of the nozzle and the rapid expansion end 40 of the SLP The gap 38 allows dewatering of the SLP through the enclosure 8 and the duct 6 which leads to the deswatering pump, not shown here as not being novel. Dewatering of the SLP 10 is necessary to start it, as described earler.

To prevent the entrance of water while the SLP is being dewatered and then pumped down by the vacuum system, a valve 4 which is moved rapidly away (it is shown in the partially-open position) by a pneumatic or seawater hydraulic hydraulic piston 42 and cylinder 44 driven driven rapidly in the appropriate direction by by compressed air or hydraulic fluid, which in this case may be sea water, delivering the motive fluid to or from the cylinder 44 to open or close it through lines 46 and 48 which connect to suitable compressors or pumps and system of control valves, not shown here.

FIG. 3 shows a cross-section through the spray plate 52 containing the small spray orifices 16, used to break the cold sea water delivered by the tube 14 into small droplets. An important aspect of the shape of the small spray orifices 16 is that in shape they are essentially like nozzle 2 in FIG. 1 in that they isolate most of the dissolve air gasses in the incoming cold quench water into very small air bubbles so that they will not break easily and deposit their contents in the strem of cold water as large air bubbles that then would have to be removed (or broken by the supersonic oscillator 20). broken and therr contents processed through the vacuum system, which requires parasitic power.

FIG. 4 is FIG. 6A from patent Beck '98, modified to clarify the differences betwen the degassing action in that patent and the use of a covergent nozzle without a following straight section to avoid coalescing the small micro-bubbles formed in the intake nozzle. In the modified concept shown in FIG. 3, the portions contained in a heavy dotted block 50 are not used here. In FIG. 1 the tube 28 carries the degassed water back to the downcomer 30 whereas in FIG. 4 that function is accomplished by duct 30. The bubble breaker 31 and tube to the vacuum system have been renumbered here to be consistent with the numbers in the figures of this application.

FIG. 5 shows an alternative duct 51 for introducing the warmest surface sea water into the SLP's intake nozzle, 2, to avoid recirculation of cold seawater from the hydraulic turbine's exhaust 35. This concept may be important in those applications at sea where a design trad-off dictates that the depth of submergence S of the lower end of the SLP's intake 2 is of the same order as the length of the hydraulic turbine's diffuser and exhaust 35.

What I claim is:

1. An improved Ocean Thermal Gradient Hydraulic Power Plant consisting of a plethora of pumps, each consisting of a series of components in listed from the point of entry of entry of the warm seawater at the bottom of the Steam Lift Pump, each pump consisting of:

A cavitating convergent nozzle with the dual function of metering the water to the SLP and simultaneously releasing most of the dissolved aiar into very small micro-bubbles, A means for dewatering the superior SLP during starting to allow a rapid inrush of sea water to allow the micro-bubbles to form A Steam Lift Pump in which a small portion of the micro-bubbles released in the Cavitating Convergent Nozzle are used to nucleat steam bubbles to form a low-density foam capabile of being supported by the high velocity pressure at the exit of the CNN, just before the steam bubbles form in the low pressure in the SLP as induced by a vacuum system A reversing section contiguious with and following the top of the SLP to reverse the flow of the warm sea water foam from upward to downward so that it may flow downard to produce power while simultaneously adjusting the velocity of the foam if desired to obtain a desired pressure, A spray of cold seawater pumped from the ocean's depth to condense the steam in the bubbles delivered from the SLP and so obtain a high density for producing a maximum power in the later hydraulic turbine, A convergent section following the condensation of the steam in the steam bubbles to accommodate the lesser volume of the water at the desired velocity, A high-frequency oscilattor to further reduce the size of any aar bubbles of significant size that would otherwise reduced the density of the down-flowing mixture of warm seawater and cold condensing water flowing to the turbine, A centrifugal separating loop, scoop, and bubble breaker to remove any air bubbles large enough to rapidly move to the interior of the loop so that they may subsequently be broken and their contents sent to a vacuum system, 0. Means for moving said separated air bubbles to the bubble breaker and vacuum system and returning them to the downcomer moving the seawater toward the hydraulic power turbine, A downcomer delivering the degassed mixture of warm seawater and cold condensing water to a large hydraulic power turbine at an optimum velocity and pressure as dictated by the requirements of the turbine, An electrical power generator or other driven device requiring large amounts of power, driven by the hydraulic turbine, 3 A draft tube of suitable length and design to deliver the seawater mixture to ocean depths as dictated by density considerations in producing power, An alternataaive intake draft tube taking warm water from near the ocean's surface when the intake of the SLPt's intake CCN is deep enough to induce recirculation of the discharged water from the turbine and so reduce the temperature of the incoming warm water.

2. The said convergent caviting nozzle of claim 1 hose purpose and design is to release a maximum of dissolved air in the smallest possible micro-bubbles and avoiding coalescence to large bubbles that would require separation, breaking and having their air contents processed through a power absorbing vacuum system after broken.

3. The means for dewatering of the SLP of claim 1 consisting of an annular space around the exit of the CNN to allow pumping from a suitable enclosure which then can be isolated during start-up of the SLP.

4. A closure valve of claim 1 wherein the inlet CNN can be closed prior to starting, then rapidly opened to allow an inrush of warm seawater to produce the low pressure and high shear necessaray to release most of the dissolved air into useful micro-bubbles.

5. The reversing section of claim 1, wherein the velocity and so pressure of the low-density, high-velocity of the foam may be adjusted prior to collapse of the steam bubbles by condensation.

6. In the nozzles of the spray-plate of claim 1, wherein their design is essentially like that of the CNN, that is, to isolate most of the dissolved air in the cold condensing water in micro bubbles so that the air will not have to be removed to the vacuum system, but may be redissolved in the rising pressure in the later downcomer, where the solubility of the air gasses will increase, according to Henry's Law.

7. The high-frequency oscillator of claim 1 wherein it is positioned advantageously in the flow stream to break up any large air bubbles into the smallest bubbles possible, so that they may rapidly re-dissolve later in in the rising pressure of the downcomeras the water's elevation decreases and its pressure further rises due to velocity pressure regain.

8. The downcomer of claim 1 in which the area is gradually increased, reducing its velocity and so increasing the pressure with velocity head regain as dictated by design considerations to deliver the sea-water mixture of warm and cold waters at an optimum pressure to the turbine and simultaneously providing a maximum pressure in the downcomer to facilitate maximum re-solution of the air contained in the water and so maximize its density.

* * * * *